United States Patent
Baig et al.

(10) Patent No.: US 11,571,663 B2
(45) Date of Patent: *Feb. 7, 2023

(54) DESALINATION MEMBRANES

(71) Applicants: Saudi Arabian Oil Company, Dhahran (SA); King Fahd University of Petroleum & Minerals, Dhahran (SA)

(72) Inventors: Umair Baig, Dhahran (SA); Turki Nabieh Baroud, Dhahran (SA); Hasan Al Abdulgader, Dammam (SA)

(73) Assignees: Saudi Arabian Oil Company, Dhahran (SA); King Fahd University of Petroleum & Minerals, Dhahran (SA)

( * ) Notice: Subject to any disclaimer, the term of this patent is extended or adjusted under 35 U.S.C. 154(b) by 252 days.

This patent is subject to a terminal disclaimer.

(21) Appl. No.: 17/097,875

(22) Filed: Nov. 13, 2020

(65) Prior Publication Data

US 2022/0152557 A1    May 19, 2022

(51) Int. Cl.
  *B01D 67/00* (2006.01)
  *B01D 69/12* (2006.01)
  (Continued)

(52) U.S. Cl.
  CPC ...... *B01D 67/0011* (2013.01); *B01D 67/0013* (2013.01); *B01D 67/0016* (2013.01);
  (Continued)

(58) Field of Classification Search
  CPC ............ B01D 67/0011; B01D 67/0013; B01D 67/0016; B01D 69/125; B01D 71/34;
  (Continued)

(56) References Cited

U.S. PATENT DOCUMENTS 4,520,044 A    5/1985  Sundet
4,931,483 A    6/1990  Matsuoka et al.
(Continued)

FOREIGN PATENT DOCUMENTS

AU    2011312881    4/2013
CN    101463140     6/2009
(Continued)

OTHER PUBLICATIONS

Razmjou et al., "Superhydrophobic modification of TiO2 nanocomposite PVDF membranes for applications in membrane distillation." Journal of membrane science 415, Oct. 2012, 850-863, 14 pages.
(Continued)

*Primary Examiner* — Krishnan S Menon
(74) *Attorney, Agent, or Firm* — Fish & Richardson P.C.

(57) ABSTRACT

Polymer-based membranes and methods for fabricating membranes are described. The methods include forming a casting solution featuring a polyvinylidene fluoride (PVDF)-based solvent and a polyvinylpyrrolidone (PVP)-based modifying agent, dispersing the casting solution to form a first element, generating a plurality of active sites on a surface of the first element, and forming a polymer-based membrane by exposing the surface of the first element to a fluorosilane composition to form a fluorosilane layer on the surface, where the fluorosilane composition includes a silane compound having at least one alkyl substituent that includes between 9 and 21 fluorine atoms.

13 Claims, 7 Drawing Sheets

(51) Int. Cl.
B01D 71/34 (2006.01)
B01D 71/70 (2006.01)
C02F 1/44 (2006.01)
C02F 103/08 (2006.01)

(52) U.S. Cl.
CPC ........... *B01D 69/125* (2013.01); *B01D 71/34* (2013.01); *B01D 71/70* (2013.01); *C02F 1/44* (2013.01); *C02F 2103/08* (2013.01)

(58) Field of Classification Search
CPC .. B01D 71/70; B01D 67/0088; B01D 67/009; B01D 67/0093; B01D 69/02; B01D 2323/04; B01D 2325/38; B01D 69/148; B01D 71/44; B01D 71/024; C02F 1/44; C02F 2103/08
See application file for complete search history.

(56) References Cited

U.S. PATENT DOCUMENTS

| | | | |
|---|---|---|---|
| 5,693,227 | A | 12/1997 | Costa |
| 9,022,227 | B2 | 5/2015 | Na et al. |
| 9,255,176 | B2 | 2/2016 | Wang et al. |
| 10,472,769 | B2 | 11/2019 | Tuteja et al. |
| 2002/0155311 | A1 | 10/2002 | Mayes et al. |
| 2016/0038885 | A1 | 2/2016 | Hogen-Esch et al. |
| 2016/0074812 | A1 | 3/2016 | Lienhard et al. |
| 2016/0107121 | A1 | 4/2016 | Lienhard et al. |
| 2017/0361277 | A1 | 12/2017 | Ghaffour et al. |
| 2018/0345227 | A1* | 12/2018 | Lin ............... B01D 69/02 |
| 2019/0299164 | A1 | 10/2019 | Khalifa |
| 2020/0156006 | A1 | 5/2020 | Tung et al. |
| 2022/0008867 | A1* | 1/2022 | Rah ............... B01D 71/02 |

FOREIGN PATENT DOCUMENTS

| | | |
|---|---|---|
| CN | 106823829 | 6/2017 |
| CN | 105749766 | 2/2018 |
| EP | 0419396 | 3/1991 |
| WO | 2013151498 | 10/2013 |

OTHER PUBLICATIONS

PCT International Search Report and Written Opinion in International Appln No. PCT/US2021/059159, dated Mar. 30, 2022, 17 pages.
Al-Hobaib et al., "Synthesis and characterization of polyamide thin-film nanocomposite membrane containing ZnO nanoparticles." Membrane Water Treatment 6.4, 2015, 309-321, 4 pages.
Alkhudhiri et al., "Air gap membrane distillation: a detailed study of high saline solution," Desalination, 2017, 403:179-186, 8 pages.
Alklaibi et al., "Transport analysis of air-gap membrane distillation. Journal of membrane science," Journal of Membrane Science, 2005, 255(1):239-253, 15 pages.
Baghbanzadeh et al., "Effects of hydrophilic CuO nanoparticles on properties and performance of PVDF VMD membranes" Desalination, 369, 2015, 75-84, 10 pages.
Bagheripour et al., "Fabrication of polyvinyl chloride based nanocomposite nanofiltration membrane: investigation of SDS/Al2O3 nanoparticle concentration and solvent ratio effects." Asia-Pacific Journal of Chemical Engineering 10.5, 2015, 791-798, 8 pages.
Boo et al., "Engineering Surface Energy and Nanostructure of Microporous Films for Expanded Membrane Distillation Applications" Environ. Sci. Technol. 50, 8112-8119, 2016, 25 pages.
Boo et al., "Omniphobic polyvinylidene fluoride (PVDF) membrane for desalination of shale gas produced water by membrane distillation" Environmental Science & Technology, 50, 2016, 12275-12282, 8 pages.

Chen et al., "A study on the fabrication of porous PVDF membranes by in-situ elimination and their applications in separating oil/water mixtures and nano-emulsions." Journal of Membrane Science 520, 2016, 760-768, 9 pages.
Essalhi et al., "Application of a porous composite hydrophobic/hydrophilic membrane in desalination by air gap and liquid gap membrane distillation: a comparative study," Separation Purification Technology, 2014, 133:176-186, 11 pages.
Feng et al., "Production of drinking water from saline water by air-gap membrane distillation using polyvinylidene fluoride nanofiber membrane." Journal of Membrane Science 311.1-2. 2008, 1-6, 6 pages.
Francis et al., "Material gap membrane distillation: A new design for water vapor flux enhancement," Journal of Membrane Science, 2013, 448:240-247, 8 pages.
Grossi et al., "Purifying surface water contaminated with industrial failure using direct contact membrane distillation." Separation and Purification Technology 233, 2020, 116052, 12 pages.
Habib et al., "Antibacterial behaviour of surface modified composite polyamide nanofiltration (NF) membrane by immobilizing Ag-doped TiO2 nanoparticles." Environmental Technology, 2019, 14 pages.
Homayoonfal et al., "A comparison between blending and surface deposition methods for the preparation of iron oxide/polysulfone nanocomposite membranes." Desalination 354, 2014, 125-142, 18 pages.
Hou et al., Fabrication and characterization of hydrophobic PVDF hollow fiber membranes for desalination through direct contact membrane distillation, Separation and Purification Technology, 69, 2009, 78-86, 9 pages.
Huang et al., "Design of super-hydrophobic microporous polytetrafluoroethylene membranes." New Journal of Chemistry 37.2, 2013, 373-379, 7 pages.
Janajreh et al., "Numerical investigation of air gap membrane distillation (AGMD): Seeking optimal performance," Desalination, 2017, 424:122-130, 9 pages.
Jiang, "Separation of water out of highly concentrated electrolyte solutions using multistage vacuum membrane distillation," KTH School of Industrial Engineering and Management, Master's of Science Thesis, Sep. 2013, 82 pages.
Khalifa et al., "Application of Response Surface and Taguchi Optimization Techniques to Air Gap Membrane Distillation for Water Desalination—A Comparative Study," Desalination and water treatment, 2016, 57(59):28513-28530, 18 pages.
Khalifa et al., "Experimental and theoretical investigation on water desalination using air gap membrane distillation," Desalination, 2015, 376:94-108, 15 pages.
Khalifa et al., "Flux enhanced water gap membrane distillation process-circulation of gap water," Separation and Purification Technology, 2020, 231:1-9, 9 pages.
Khalifa et al., "Performance and Optimization of Air Gap Membrane Distillation System for Water Desalination," Arabian Journal for Science and Engineering, 2015, 13 pages.
Khalifa et al., "Water and air gap membrane distillation for water desalination—An experimental comparative study," Separation and Purification Technology, 2015, 141:276-284, 9 pages.
Khalifa, "Performances of air gap and water gap MD desalination modules," Water Practice and Technology, 2018, 13 (1):200-209, 10 pages.
Khorshidi et al., "Robust fabrication of thin fdm polyamide-TiO 2 nanocomposite membranes with enhanced thermal stability and anti-biofouling propensity." Scientific reports 8.1, 2018, 1-10, 10 pages.
Kwak et al., "Hybrid organic/inorganic reverse osmosis (ro) membrane for bactericidal anti-fouling. 1. Preparation and characterization of tio2 nanoparticle self-assembled aromatic polyamide thin-film-composite (TFC) membrane" Environmental Science and Technology, 35, 2001, 2388-2394, 7 pages.
Lawal et al., "Experimental investigation of an air gap membrane distillation unit with double-sided cooling channel," Desalination and Water Treatment, 2015, 57(24), 16 pages.

(56) References Cited

OTHER PUBLICATIONS

Li et al., "Desalination of dye solution utilizing PVA/PVDF hollow fiber composite membrane modified with TiO2 nanoparticles" Journal of Membrane Science, 471, 2014, 118-129, 49 pages.

Li et al., "Electrospun superhydrophobic organic/inorganic composite nanofibrous membranes for membrane distillation." ACS applied materials & interfaces 7.39, 2015, 21919-21930, 45 pages.

Li et al., "Facile fabrication of omniphobic PVDF composite membrane via a waterborne coating for anti-wetting and anti-fouling membrane distillation." Journal of Membrane Science 589, 2019, 117262, 37 pages.

Li et al., "Microporous polypropylene and polyethylene hollow fiber membranes. Part 3. Experimental studies on membrane distillation for desalination," Desalination, 2003, 155(2): 153-156, 4 pages.

Li et al., "Preparation and characterization of poly (ether sulfone)/fluorinated silica organic-inorganic composite membrane for sulfur dioxide desulfurization", High Performance Polymers 31, 2019, 72-85, 14 pages.

Li et al., "Preparation of omniphobic PVDF membranes with silica nanoparticles for treating coking wastewater using direct contact membrane distillation: Electrostatic adsorption vs. chemical bonding" Journal of Membrane Science, 574, 2019, 349-357, 9 pages.

Li et al., "Reduced graphene oxide-NH2 modified low pressure nanofiltration composite hollow fiber membranes with improved water flux and antifouling capabilities." Applied Surface Science 419, 2017, 418-428, 35 pages.

Liao et al., "Fane Fabrication of polyvinylidene fluoride (PVDF) nanofiber membranes by electro-spinning for direct contact membrane distillation" Journal of Membrane Science, 425-426, 2013, 30-39, 10 pages.

Liu et al., "Experimental study of the optimal vacuum pressure in vacuum assisted air gap membrane distillation process," Desalination, 2017, 414:63-72, 10 pages.

Mahmoudi et al., "Further investigation of simultaneous fresh water production and power generation concept by permeate gap membrane distillation system." Journal of Membrane Science 572, 2019, 230-245, 16 pages.

Mahmoudi et al., "A unique permeate gap membrane distillation system for combined fresh water and power production," Energy Procedia, 2019, 160:170-177, 8 pages.

Mansourpanah et al., "Self-antifouling properties of magnetic Fe2O3/SiO2-modified poly (piperazine amide) active layer for desalting of water: Characterization and performance." Desalination 419, 2017, 79-87, 9 pages.

Nagarale et al., "Organic-inorganic hybrid membrane: Thermally stable cation-exchange membrane prepared by the sol-gel method" Macromolecules, 37, 2004, 10023-10030, 8 pages.

Naidu et al., "Hybrid membrane distillation: Resource, nutrient and energy recovery," Journal of Membrane Science, 2020, 599:1-21, 21 pages.

Riera, "Integrated solution for DWTP reverse osmosis brine management: CO2 stripping followed by membrane distillation," Aalto University School of Chemical Technology, Master's Thesis for the degree of Master of Science in Technology, Dec. 2015, 92 pages.

Sun et al., "A study of thermodynamics and kinetics pertinent to formation of PVDF membranes by phase inversion" Desalination, 309, 2013, 156-164, 9 pages.

Swaminathan et al., "Energy efficiency of permeate gap and novel conductive gap membrane distillation," Journal of Membrane Science, Sep. 2016, 502, 20 pages.

Thomas et al., "Pore structure control of PVDF membranes using a 2-stage coagulation bath phase inversion process for application in membrane distillation (MD)" Journal of Membrane Science, 452, 2014, 470-480, 11 pages.

Tomaszewska, "Preparation and properties of flat-sheet membranes from poly(vinylidene fluoride) for membrane distillation" Desalination, 104, 1996, 1-11, 11 pages.

U.S. Department of the Interior Bureau of Reclamation, "Report No. 198 Desalination and Water Purification Research and Development Program Report No. 198, Developing Anti-Wetting and Anti-Fouling Membranes for Membrane Distillation" Dec. 2016, 850 pages.

Warsinger et al., "Scaling and fouling in membrane distillation for desalination applications: a review." Desalination 356, 2015, 294-313, 20 pages.

Woo et al., "Hierarchical Composite Membranes with Robust Omniphobic Surface Using Layer-By-Layer Assembly Technique" Environmental Science and Technology, 52, 2018, 2186-2196, 38 pages.

Wu et al., "A Novel Method to Fabricate Polymer Porous Membrane by Hot-pressing Process." Advanced Materials Research 1081, 2014, 227-231, 6 pages.

Xu et al., "Fabrication of super-hydrophobic polypropylene hollow fiber membrane and its application in membrane distillation" Desalination, 414, 2017, 10-17, 8 pages.

Yu et al., "A poly (arylene ether sulfone) hybrid membrane using titanium dioxide nanoparticles as the filler: preparation, characterization and gas separation study." High Performance Polymers 29.1, 2017, 26-35, 10 pages.

Zargar et al., "Understanding functionalized silica nanoparticles incorporation in thin film composite membranes: Interactions and desalination performance." Journal of Membrane Science 521, 2017, 53-64, 39 pages.

Zheng et al., "Preparation of omniphobic PVDF membrane with hierarchical structure for treating saline oily wastewater using direct contact membrane distillation" Journal of Membrane Science, 555, 2018, 197-205, 9 pages.

* cited by examiner

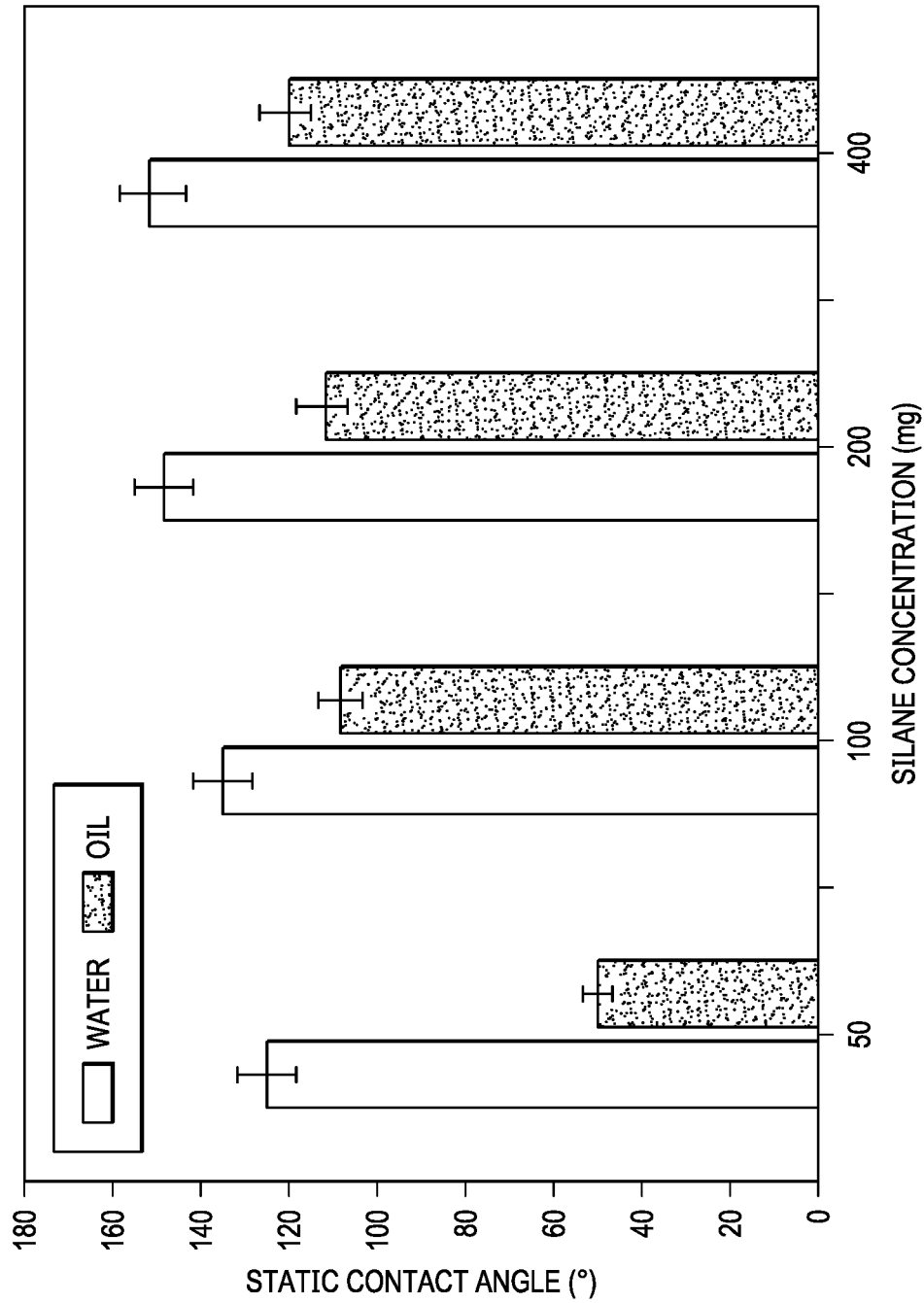

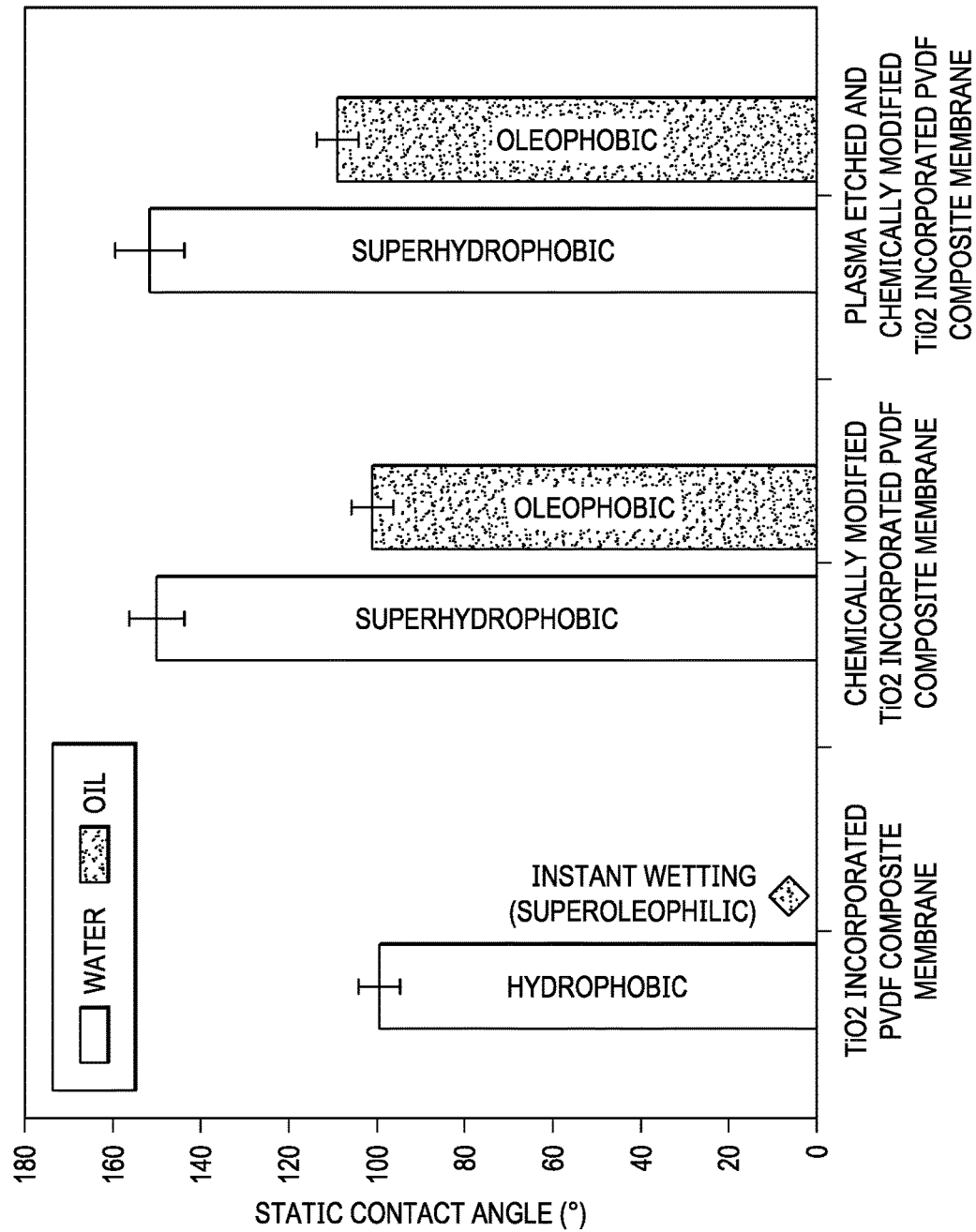

DESALINATION MEMBRANES

TECHNICAL FIELD

The present disclosure generally relates to membranes for desalination of water, and methods for fabricating such membranes.

BACKGROUND

Membrane desalination uses membranes, which are becoming a common commodity to extract freshwater from saline feedwater. The feedwater is forced onto the surface of a membrane, which selectively passes water and retains salts.

SUMMARY

This specification describes super-hydrophobic, oleophobic, and anti fouling polymer-based membranes for desalination of water, and methods that can be used to fabricate such membranes. The methods provide a simple and scalable chemical procedure to create membranes with super-hydrophobic, and the oleo-phobic characteristics at high contact angles. In general, the methods described herein for formation of polymer-based membranes involve phase inversion. Phase inversion is a process of controlled polymer transformation from a liquid phase to solid phase. Different techniques can used to create phase inversion membranes: precipitation from vapor phase, precipitation by controlled evaporation, thermally induced phase separation, and immersion precipitation.

The methods include forming a casting solution using a polyvinylidene fluoride (PVDF)-based solvent and a polyvinylpyrrolidone (PVP)-based modifying agent. In some embodiments, the methods can also include forming a casting solution using a polyvinylidene fluoride (PVDF)-based solvent, a polyvinylpyrrolidone (PVP)-based modifying agent, and metal-based nanoparticles. The methods include dispersing the casting solution to form a first element and forming a layer on top of the first element from a silane material with fluorinated alkyl substituents. The fluorinated silane layer can be formed by methods such as dip-coating and plasma etching. The first element and the fluorinated silane layer form the membrane. The fluorinated silane layer can include heneicosafluorododecyltrichloro silane ($CF_3(CF_2)_9CH_2CH_2SiCl_3$), where the alkyl substituent on the silicon atom has twenty-one fluorine atoms (i.e., the alkyl substituent is designated an "F21" group).

Other fluorinated silanes can also be used in addition to, or as an alternative to, heneicosafluorododecyltrichloro silane ($CF_3(CF_2)_9CH_2CH_2SiCl_3$). For example, more generally, the fluorinated silane layer can include one or more materials having the chemical formula ($CF_3(CF_2)_n(CH_2)_m SiCl_3$). In general, n can be 3, 4, 5, 6, 7, 8, 9, 10, 11, or 12, or even more than 12. Further, m can be 0, 1, 2, 3, 4, 5, 6, or even more than 6.

In some embodiments, one or more of the —$CH_2$— units in the chemical formula above can more generally be —$CR_1R_2$—, where each of $R_1$ and $R_2$ are independently selected from the group consisting of: $C_1$-$C_{10}$ primary, secondary, or tertiary alkyl groups; $C_2$-$C_{10}$ alkene groups; $C_2$-$C_{10}$ alkyne groups; H; $C_1$-$C_{10}$ alkoxy groups; halogen groups (F, Cl, Br, I); hydroxyl groups; $C_1$-$C_{10}$ primary, secondary, or tertiary amine groups; $C_2$-$C_{10}$ epoxide groups; $C_2$-$C_{10}$ ether groups; $C_3$-$C_{12}$ cyclic aromatic groups, which can optionally include from 1-3 heteroatoms (P, N, O, S); and $C_2$-$C_{10}$ cyclic alkyl groups, which can optionally include from 1-3 heteroatoms (P, N, O, S).

In certain embodiments, one or more of the —Cl substituents of the Si atom in the chemical formula above can be a different substituent, so that more generally, the silane species can be represented by the formula A-SiR'R"R'". In this formula, A represents the substituent ($CF_3(CF_2)_n(CH_2)_m$—) discussed above, while each of R', R", and R'" can be independently selected from the group consisting of: any of the types of groups ($CF_3(CF_2)_n(CH_2)_m$—) discussed herein; $C_1$-$C_{10}$ primary, secondary, or tertiary alkyl groups; $C_2$-$C_{10}$ alkene groups; $C_2$-$C_{10}$ alkyne groups; H; $C_1$-$C_{10}$ alkoxy groups; halogen groups (F, Cl, Br, I); hydroxyl groups; $C_1$-$C_{10}$ primary, secondary, or tertiary amine groups; $C_2$-$C_{10}$ epoxide groups; $C_2$-$C_{10}$ ether groups; $C_3$-$C_{12}$ cyclic aromatic groups, which can optionally include from 1-3 heteroatoms (P, N, O, S); and $C_2$-$C_{10}$ cyclic alkyl groups, which can optionally include from 1-3 heteroatoms (P, N, O, S).

Without wishing to be bound by theory, it is believed that fluorination of the silane species can impart super-hydrophobic, oleo-phobic, and/or anti-fouling properties to the membranes described herein. Accordingly, the silane species used typically have a high degree of fluorination, and carbon atoms present in substituents of Si may even be perfluorinated. More generally, for the silane species used to form the membranes described herein, the total number of non-C—C, non Si—C covalent bonding sites on C atoms can be j, where j=5 or more (e.g., 6, 7, 8, 9, 10, 12, 14, 16, 18, 20, 22, 24, 26, 28, 30, or even more than 30). The number of such sites occupied by F substituents, k, can be k=5 or more (e.g., 6, 7, 8, 9, 10, 11, 12, 13, 14, 15, 16, 17, 18, 19, 20, 21, 22, 23, 24, 25, 26, 27, 28, 29, 30, or even more). The degree of fluorination, k/j, can be 0.50 or more (e.g., 0.55 or more, 0.60 or more, 0.65 or more, 0.70 or more, 0.75 or more, 0.80 or more, 0.85 or more, 0.90 or more, 0.95 or more, 0.98 or more, 1)

The methods described herein are simple, and scalable for the fabrication of super-hydrophobic and oleo-phobic membranes at a reduced time using only a single step dip-coating approach. The methods also allow chemical modification of the membranes with or without plasma etching, yielding membranes with super-hydrophobic properties and/or oleo-phobic properties, characterized by relative high water and oil contact angles, respectively.

In this disclosure, a surface is "hydrophobic" if it exhibits a water contact angle greater than 90°.

A surface is defined as "super-hydrophobic" if it exhibits a water contact angle greater than or equal to 150°.

A surface is defined as "omniphobic" if it exhibits a water and oil contact angles greater than 90°, where the oil used to measure the oil contact angle is n-hexane.

A surface is defined as "oleo-phobic" if it exhibits an oil contact angle greater than 90°, where the oil used to measure the oil contact angle is n-hexane.

In this disclosure, the chemical group "Fa" refers to a primary, perfluorinated alkyl group with "a" fluorine atoms as substituents on carbon atoms of the alkyl group. For example, the chemical group F9 has the structure $CF_3(CF_2)_2CF_2$—, the chemical group F17 has the structure $CF_3(CF_2)_6CF_2$—, and the chemical group F21 has the structure $CF_3(CF_2)_8CF_2$—. More generally, chemical group Fa has the structure $CF_3(CF_2)_pCF_2$—, where a=2p+5.

In some aspects, a method for fabricating a polymer-based membrane includes: forming a casting solution including a polyvinylidene fluoride (PVDF)-based solvent, and a polyvinylpyrrolidone (PVP)-based modifying agent; dispersing the casting solution to form a first element; generating a plurality of active sites on a surface of the first element; and forming a polymer-based membrane by exposing the surface of the first element to a fluorosilane composition to form a fluorosilane layer on the surface; and the fluorosilane composition includes a silane compound including at least one alkyl substituent comprising between 9 and 21 fluorine atoms.

Embodiments of the method for fabricating a polymer-based membrane can include one or more of the following features.

In some embodiments, the method also includes exposing the surface of the first element to the fluorosilane composition by dip-coating the surface in the fluorosilane composition to form the fluorosilane layer.

In some embodiments, generating the plurality of active sites includes plasma etching the surface of the first element.

In some embodiments, the method also includes forming the casting solution includes dissolving a polyvinylidene fluoride-based agent in a solvent. In some cases, the polyvinylidene fluoride-based agent includes unsubstituted polyvinylidene fluoride. In some cases, the polyvinylidene fluoride-based agent includes at least one substituted polyvinylidene fluoride compound. In some cases, the polyvinylidene fluoride-based agent includes unsubstituted polyvinylidene fluoride and at least one substituted polyvinylidene fluoride compound. In some cases, a molar percentage concentration of the polyvinylidene fluoride-based agent in the casting solution is between 5% and 20%.

In some embodiments, the method also includes forming the first element by coagulating the dispersed casting solution in a coagulation bath.

In some embodiments, the method also includes dispersing the casting solution on a surface using a casting knife.

In some embodiments, the fluorosilane composition includes at least one fluorinated chlorosilane compound. In some cases, the at least one fluorinated chlorosilane compound includes at least one alkyl substituent covalently bonded to a silicon atom of the at least one chlorosilane compound, and the at least one alkyl substituent includes at least 9 fluorine atoms. In some cases, the fluorinated chlorosilane compound includes 3,3,4,4,5,5,6,6,7,7,8,8,9,9,10,10,11,11,12,12,12-heneicosafluorododecyltrichlorosilane $(CF_3(CF_2)_9CH_2CH_2SiCl_3)$. In some cases, a weight percentage of the at least one fluorinated chlorosilane compound in the membrane is between 5 weight % and 50 weight %.

In some aspects, a polymer-based membrane includes: a first element that includes a polyvinylpyrrolidone (PVP) modifying agent, and a polyvinylidene fluoride (PVDF)-based compound; a fluorosilane layer disposed on the first element and comprising at least one fluorinated chlorosilane compound; a water contact angle for the membrane is greater than 150°; and an oil contact angle for the membrane is greater than 100°.

Embodiments of the polymer-based membrane can include one or more of the following features.

In some embodiments, the at least one alkyl substituent is a primary alkyl substituent that comprises 9, 17, or 21 fluorine atoms.

In some embodiments, the at least one fluorinated chlorosilane compound includes a chlorosilane compound comprising at least two hydrocarbon substituents covalently bonded to a silicon atom of the chlorosilane compound, and at least one of the at least two hydrocarbon substituents includes fluorine atoms.

Without wishing to be bound by theory, it is believed that the presence of fluorinated alkyl substituents achieves chemical modification of the membrane with improved characteristics relative to conventional membranes used for desalination. For example, the improved characteristics can include, but are not limited to, repulsion of surface contaminants and reduced fouling, leading to longer service lifetimes and increased throughput during service. The presence of metal-based nanoparticles also enhances the mechanical strength of the polymer-based membranes.

The details of one or more embodiments are set forth in the accompanying drawings and the description. Other features and advantages will be apparent from the description, drawings, and claims.

DESCRIPTION OF DRAWINGS

FIG. 6 is a chart showing the wetting behavior of a polymer-based membrane with $TiO_2$ nanoparticles treated with different concentrations of a fluorinated silane constituent.

FIG. 7 is a chart showing the comparative wetting behavior of various polymer-based membranes with $TiO_2$ nanoparticles fabricated according to different methods.

DETAILED DESCRIPTION

Membranes can be used for water desalination. Particularly, membranes made from hydrophobic polymers such as polypropylene (PP), polyvinylidene fluoride (PVDF), and polytetrafluoroethylene (PTFE) can be used for water desalination. Membranes made from PVDF exhibit excellent chemical, mechanical, and thermal properties with high porosity. However, organic pollutants such as grease, oil, and other low surface tension contaminants effectively wet the hydrophobic membranes and reduce their hydrophobic characteristics.

Methods such as tape casting, hot pressing, electro-spinning, and phase inversion are commonly used in the fabrication of polymeric membranes. The phase inversion approach is a facile and scalable method for the fabrication of highly porous large-scale polymeric membranes on a smooth glass surface. This specification describes methods that can be used to fabricate super-hydrophobic, oleo-phobic, and anti-fouling polymer-based membranes for desalination of water and other applications.

Figure 1A:
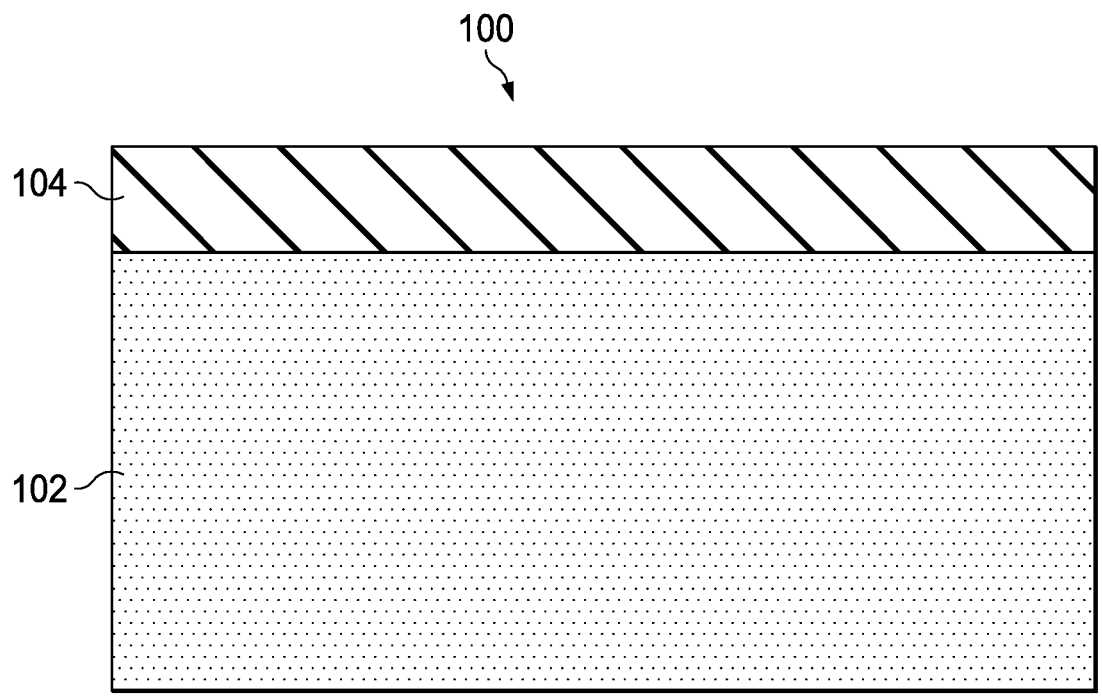
FIGS. 1A and 1B are schematic views of an example of a polymer-based membrane.
Figure 1B:
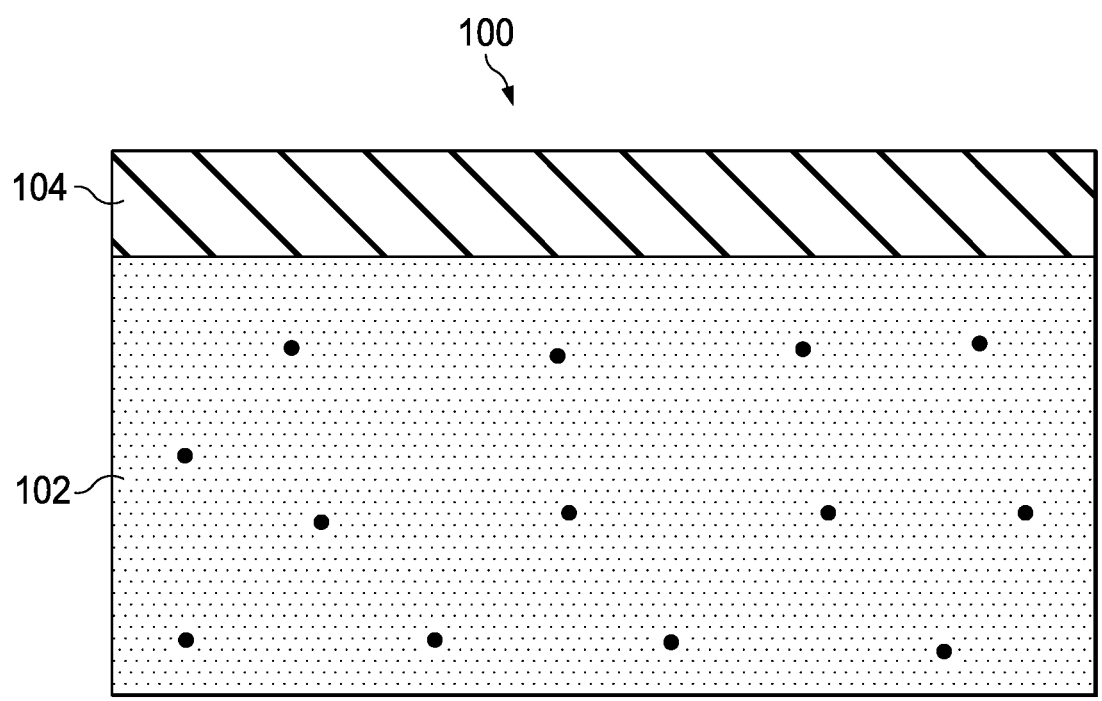

FIGS. 1A and 1B are schematic views of an example of a polymer-based membrane 100, respectively. The polymer-based membrane 100 includes a first element 102 that provides a base and support for the membrane. The membrane 100 also includes a fluorosilane layer 104 disposed on top of the first element 102. The fluorosilane layer 104 improves the super-hydrophobic, oleo-phobic, and anti-fouling properties of the membrane 100. In general, elements 102 and 104 have different compositions, and as a result, their physical properties differ.

In some embodiments, element 102 includes a first component that includes polyvinylidene or a substituted polyvinylidene. For example, in certain embodiments, the first component includes polyvinylidene fluoride $(CH_2CF_2)_n$. In some embodiments, the polyvinylidene fluoride can have an average molecular mass of between 35,000 grams per mole (g/mol) and 65,000 g/mol (e.g., between 35.000 g/mol and 60,000 g/mol, between 40,000 g/mol and 60,000 g/mol, between 40,000 g/mol and 55,000 g/mol, between 45,000 g/mol and 55,000 g/mol, about 53,400 g/mol). In general, the molecular mass of polyvinylidene fluoride is selected based on the physical properties that are imparted to the membrane, and interactions between polyvinylidene fluoride and other components of the membrane.

In certain embodiments, element 102 includes a first component that includes one or more substituted polyvinylidene fluoride polymers. Examples of such polymers include, but are not limited to, polyvinylidene fluoride polymers that include one or more $C_{1-10}$ linear or branched alkyl substituents, one or more $C_{2-10}$ linear or branched alkenyl substituents, one or more $C_{2-10}$ linear or branched alkynyl substituents, one or more halide substituents, one or more alkoxy substituents, and one or more cyclic $C_{3-10}$ aliphatic substituents, optionally including from 1-3 heteroatoms selected from O, N, S, and P, one or more $C_{3-15}$ aromatic substituents, optionally including from 1-5 heteroatoms selected from O, N, S, and P. Such polymers can include combinations of any one or more of these substituents in every monomer unit, in every second monomer unit, in every third monomer unit, and more generally, in every $n^{th}$ monomer unit, where n is 2 or more (for example, 3 or more, 4 or more, 5 or more, 6 or more, 8 or more, 10 or more, or even more).

Examples of such polymers also include copolymers of different monomers, individually substituted with any of the substituents described herein. Suitable copolymers can include diblock copolymers, triblock copolymers, and copolymers of higher order (such as quaternary block copolymers). Further still, examples of such polymers include blends of any of the foregoing polymers of the first component. For example, blends of PVDF with P(MMA-r-MnG), blends of PVDF with polyethyleneimine branched (polyion) components, blends of PVDF with a branched component having poly(acrylic acid) side chain, or a blend of a polysulfone base with another miscible component.

In some embodiments, element 102 includes a second component that includes polyvinylpyrrolidone $(C_6H_9NO)_n$. In certain embodiments, the polyvinylpyrrolidone can have an average molecular mass of between 7,000 g/mol and 13,000 g/mol (e.g., between 7,500 g/mol and 13,000 g/mol, between 7,500 g/mol and 12,500 g/mol, between 8,000 g/mol and 12,500 g/mol, between 8,000 g/mol and 12,000 g/mol, between 8,500 g/mol and 12,000 g/mol, between 8,500 g/mol and 11,500 g/mol, between 9,000 g/mol and 11,500 g/mol, between 9,000 g/mol and 11,000 g/mol, about 10,000 g/mol).

In some embodiments, the second component includes one or more polymers in addition to, or as alternatives to, polyvinylpyrrolidone. Examples of such polymers include, but are not limited to, polytetrafluoroethylene (PTFE), polypropylene (PP), and polyethylene (PE).

In some embodiments, the second component includes one or more substituted polyvinylpyrrolidones. Examples of such polymers include, but are not limited to, polyvinylpyrrolidone polymers that include one or more $C_{1-10}$ linear or branched alkyl substituents, one or more $C_{2-10}$ linear or branched alkenyl substituents, one or more $C_{2-10}$ linear or branched alkynyl substituents, one or more halide substituents, one or more alkoxy substituents, and one or more cyclic $C_{3-10}$ aliphatic substituents, optionally including from 1-3 heteroatoms selected from O, N, S, and P, one or more $C_{3-15}$ aromatic substituents, optionally including from 1-5 heteroatoms selected from O, N, S, and P. Such polymers can include combinations of any one or more of these substituents in every monomer unit, in every second monomer unit, in every third monomer unit, and more generally, in every $n^{th}$ monomer unit, where n is 2 or more (for example, 3 or more, 4 or more, 5 or more, 6 or more, 8 or more, 10 or more, or even more).

Examples of such polymers also include copolymers of different monomers, individually substituted with any of the substituents described herein. Suitable copolymers can include diblock copolymers, triblock copolymers, and copolymers of higher order (such as quaternary block copolymers). One example of a suitable copolymer is polyvinylidene fluoride-co-hexafluoropropylene (PVDF-HFP), but more generally, copolymers of any of the monomers described herein can be used. Further still, examples of such polymers include blends of any of the foregoing polymers of the first component. For example, blends of PVDF with P(MMA-r-MnG), blends of PVDF with polyethyleneimine branched (polyion) components, blends of PVDF with a branched component having poly(acrylic acid) side chain, or a blend of a polysulfone base with another miscible component.

In some embodiments, a weight percentage of the first component of first element 102 described above is between 5% and 50% (e.g., between 5% and 45%, between 10% and 45%, between 15% and 45%, between 15% and 40%, between 20% and 40%, between 20% and 35%, between 25% and 35%, between 5% and 35%, between 5% and 30%, between 10% and 35%, between 10% and 30%, or any other range within these ranges).

In certain embodiments, a molar percentage of the first component in first element 102 is between 10 mole % and 50 mole % (e.g., between 10 mole % and 45 mole %, between 15 mole % and 45 mole %, between 15 mole % and 40 mole %, between 20 mole % and 40 mole %, between 20 mole % and 35 mole %, between 25 mole % and 35 mole %, between 10 mole % and 40 mole %, between 10 mole % and 30 mole %, between 15 mole % and 30 mole %, or any other range within these ranges).

In some embodiments, a weight percentage of the second component of first element 102 described above is between 1% and 50% (e.g., between 1% and 45%, between 5% and 45%, between 15% and 45%, between 15% and 40%, between 20% and 40%, between 20% and 35%, between 25% and 35%, between 5% and 35%, between 5% and 30%, between 10% and 35%, between 10% and 30%, or any other range within these ranges).

In certain embodiments, a molar percentage of the second component in first element 102 is between 10 mole % and 50 mole % (e.g., between 10 mole % and 45 mole %, between 15 mole % and 45 mole %, between 15 mole % and 40 mole %, between 20 mole % and 40 mole %, between 20 mole % and 35 mole %, between 25 mole % and 35 mole %, between 10 mole % and 40 mole %, between 10 mole % and 30 mole %, between 15 mole % and 30 mole %, or any other range within these ranges).

In some embodiments, first element 102 includes nanoparticles as shown in FIG. 1B. In general, nanoparticles function to adjust both chemical and physical properties of first element 102. For example, in certain embodiments, nanoparticles can increase the mechanical strength (the compressive strength, tensile strength, or resistance to shear) of first element 102. In some embodiments, nanoparticles can adjust chemical properties of first element 102. As an example, nanoparticles can be used to control functionalization, and more generally, the chemical reactivity of first element 102.

A variety of different types of nanoparticles can be present in first element 102. In some embodiments, first element 102 can include one or more different types of metal-based nanoparticles. Examples of such nanoparticles include, but are not limited to, titanium dioxide ($TiO_2$) nanoparticles, silicon dioxide ($SiO_2$) nanoparticles, zinc oxide (ZnO) nanoparticles, iron oxide ($Fe_2O_3$) nanoparticles, copper oxide (CuO) nanoparticles, and aluminum oxide ($Al_2O_3$) nanoparticles.

First element 102 can also include multiple different types of nanoparticles, including combinations of 2 or more (e.g., 3 or more, 4 or more, 5 or more, or even more) different types of nanoparticles. Any of the different types of nanoparticles discussed herein can be used in such combinations.

In some embodiments, a weight percentage of nanoparticles in first element 102 can be between 1.0 weight % and 5.0 weight % (e.g., between 1.0 weight % and 4.5 weight %, between 1.0 weight % and 4.0 weight %, between 1.0 weight % and 3.5 weight %, between 1.0 weight % and 3.0 weight %, between 1.5 weight % and 5.0 weight %, between 1.5 weight % and 4.5 weight %, between 1.5 weight % and 4.0 weight %, between 1.5 weight % and 3.5 weight %, between 2.0 weight % and 5.0 weight %, between 2.0 weight % and 4.5 weight %, between 2.0 weight % and 4.0 weight %, or any range within one of the foregoing ranges).

In certain embodiments, an average numerical density of nanoparticles in first element 102 is between 1.0 $\mu m^{-3}$ and 25 $\mu m^{-3}$ (e.g., between 2.0 $\mu m^{-3}$ and 25 $\mu m^{-3}$, between 2.0 $\mu m^{-3}$ and 20 $\mu m^{-3}$, between 3.0 $\mu m^{-3}$ and 20 $\mu m^{-3}$, between 3.0 $\mu m^{-3}$ and 15 $\mu m^{-3}$, between 4.0 $\mu m^{-3}$ and 15 $\mu m^{-3}$, between 5.0 $\mu m^{-3}$ and 15 $\mu m^{-3}$, between 5.0 $\mu m^{-3}$ and 10 $\mu m^{-3}$, or any range within one of the foregoing ranges). Suitable nanoparticles for use in first element 102 can be prepared using a variety of methods.

Examples of such methods are described in the following references, the entire contents of each of which are incorporated by reference herein: Yu et al., "A poly(arylene ether sulfone) hybrid membrane using titanium dioxide nanoparticles as the filler: Preparation, characterization and gas separation study", 29 (2016) 26-35; Kwak et al., "Hybrid organic/inorganic reverse osmosis (ro) membrane for bactericidal anti fouling. 1. Preparation and characterization of TiO2 nanoparticle self-assembled aromatic polyamide thin-film-composite (TFC) membrane", Environmental Science and Technology, 35 (2001) 2388-2394; Khorshidi et al., "Robust fabrication of thin film polyamide-$TiO_2$ nanocomposite membranes with enhanced thermal stability and antibiofouling propensity", Scientific Reports, 8 (2018) 1, DOI: 10.1038/s41598-017-18724-w; Bagheripour et al., "Fabrication of polyvinyl chloride based nanocomposite nanofiltration membrane: investigation of SDS/Al2O3 nanoparticle concentration and solvent ratio effects", Asia-Pacific Journal of Chemical Engineering, 10 (2015) 791-798. Certain nanoparticles for use in first element 102 are available commercially as follows: $TiO_2$- and $Al_2O_3$-based nanoparticles are available from Sigma Aldrich, St. Louis, Mo., and $SiO_2$- and ZnO-based nanoparticles are available from Cerion Nanomaterials, Rochester, N.Y.

In some embodiments, element 104 includes a first component that includes a silane compound with fluorine-containing substituents. Without wishing to be bound by theory, it is believed that the silane compound can impart super-hydrophobic and oleo-phobic properties to the membrane, depending upon the nature of the silane compound, the composition of element 104, and of the overall membrane. It is also believed that the silane compound can, depending upon the nature of the compound, effectively adjust certain chemical properties of element 104. As an example, the silane compound can be used to control functionalization, and more generally, the chemical reactivity of element 104.

A variety of different types of fluorinated silanes can be present in element 104. In some embodiments, element 104 can include a silane compound with one or more different types of fluorinated alkyl groups. Examples of such groups include, but are not limited to, silanes with one or more alkyl groups having nine fluorine atom substituents (e.g., F9 groups), silanes with one or more alkyl groups having seventeen fluorine atom substituents (e.g., F17 groups), and silanes with one or more alkyl groups having twenty one fluorine atom substituents (e.g., F21 groups). In some embodiments, a single type of fluorinated silane compound is used to form element 104. Alternatively, in certain embodiments 2 or more different types of silane compounds (e.g., 3 or more, 4 or more, 5 or more, or even more) can be used to form element 104. Further, in some embodiments, each silane compound contains only a single type of fluorine-containing substituent, while in certain embodiments, one or more of the silanes used to form element 104 includes 2 or more (e.g., 3 or more, 4 or more, 5 or more, 6 or more, or even more) different types of fluorine-containing substituents. As an example, element 104 can include a silane compound with one or more F9 and one or more F17 groups, a silane compound with one or more F9 and one or more F21 groups, a silane compound with one or more F17 and one or more F21 groups, and/or a silane compound with one or more F9 groups, one or more, F17 groups, and one or more F21 groups. More generally, combinations of any 2 or more of the silane compounds described herein can be present in element 104, and each of the silane compounds can include one or more, two or more, three or more, four or more, five or more, six or more, or even more of the different types of fluorine-containing substituents described herein.

In some embodiments, a weight percentage of all fluorinated silane compounds in element 104 can be between 5 weight % and 50 weight % (e.g., between 10 weight % and 45 weight %, between 10 weight % and 40 weight %, between 10 weight % and 35 weight %, between 10 weight % and 30 weight %, between 15 weight % and 50 weight %, between 15 weight % and 45 weight %, between 15 weight % and 40 weight %, between 15 weight % and 35 weight %, between 20 weight % and 50 weight %, between 20 weight % and 45 weight %, between 20 weight % and 40 weight %, or any range within one of the foregoing ranges). In particular, the inventors have discovered that a weight percentage between 5 weight % and 25 weight % of the fluorinated silane compounds can impart super-hydrophobicity to the membrane. Super-hydrophobicity was observed, for example, when the fluorinated silane compound present in element 104 was F21-$CH_2CH_2SiCl_3$, which has the chemical name 3,3,4,4,5,5,6,6,7,7,8,8,9,9,10,10,11,11,12,12,12-Heneicosafluorododecyltrichlorosilane.

Figure 2A:
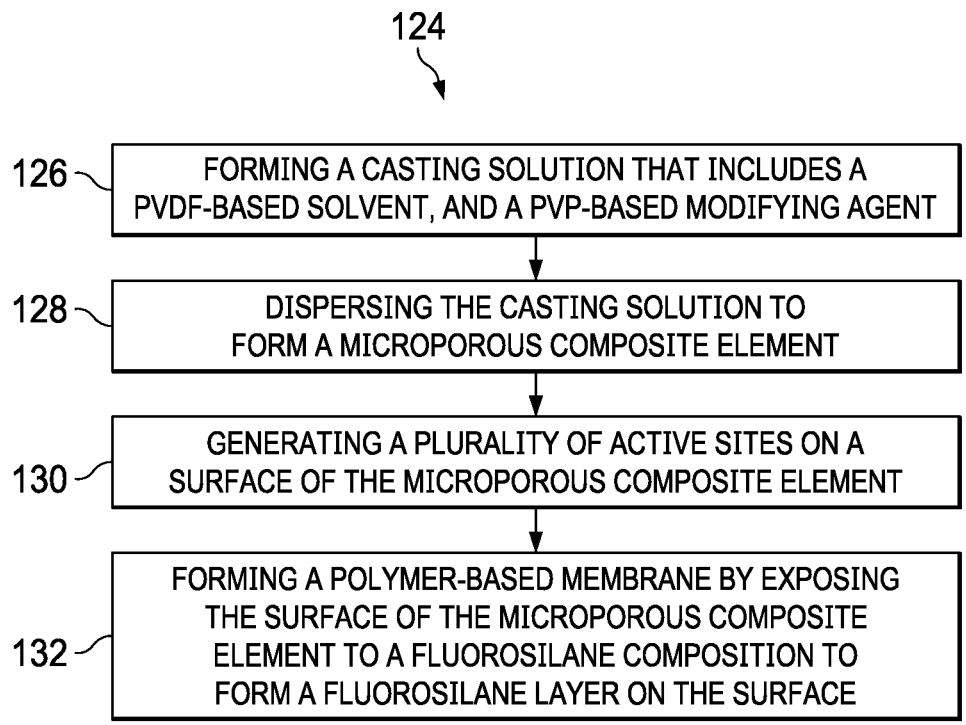
FIGS. 2A and 2B are flowcharts showing methods for fabricating polymer-based membranes.

FIG. 2A is a flowchart showing a method 124 for fabricating a polymer-based membrane 100. At step (126) the method includes forming a casting solution that includes a PVDF-based solvent, and a PVP-based modifying agent. In some examples, the casting of the PVDF solution includes one or more of tape casting, hot pressing, or electrospinning. In an example of this method, a 15% PVDF-based solvent in N, N-dimethyl formamide (DMF) solvent (e.g., N, N-dimethylformamide ($C_3H_7NO$; 99%)) was magnetically stirred for 24 hours at a temperature of 40 Celsius (° C.) in a glass vessel. Next, a 5% solution of PVP was added followed by the same stirring period of 24 hours and at a temperature of 40° C. The PVP serves as a good adhesive, and a pore-forming agent.

In general, the percentage of the PVDF-based solvent in the casting solution can be adjusted to control the properties of first element. In the example above, the PVDF-based solvent was present at a concentration of 15 mole % in the DMF solvent. More generally, the PVDF-based solvent can be present at a concentration of between 5 mole % and 20 mole % (e.g., between 7 mole % and 20 mole %, between 10 mole % and 20 mole %, between 7 mole % and 17 mole %, between 10 mole % and 17 mole %, or any range within these ranges) in the DMF solvent.

At step (128) the casting solution is dispersed to form a first element 102. For example, the homogeneous and bubble-free PVDF-based solution was cast on a glass surface with the help of a casting knife and kept at room temperature for 5 minutes. Next, the casted solution was placed in a first coagulation bath (e.g., consisting of pure ethanol (e.g., $C_2H_6O$, 99%)) for 5 minutes, and then it was placed in a second coagulation bath (e.g., consisting of 5-25% n-propanol (e.g., $C_3H_8O$) in distilled water) for 24 hours at ambient conditions. The first element 102 was removed from the second coagulation bath and rinsed several times with deionized water and dried at room temperature for 24 hours. The coagulation bath facilitates the precipitation of casted polymer-based membrane to form a solid membrane matrix.

At step (130) a plurality of active sites is generated on a surface of the first element 102. In an example, the active sites were generated by placing the first element 102 or the PVDF-based membrane into a plasma cleaner (e.g., Harrick Plasma Cleaner (PDC-32 G)) for etching. Plasma etching was performed at a pressure of 100 millibars (mbars) for 10 minutes to generate active sites on the surface of the first element 102.

In general in step (130), a variety of different methods can be used to generate active sites on the surface of element 102. For example, in certain embodiments, such methods can include wet etching, ion sputtering, sand blasting, reactive-ion etching, and combinations thereof. In some embodiments, the process can generate a density of the active sites as a percentage of the total surface area on the surface of membrane 100 that can be between 25% and 90% (e.g., between 30% and 90%, between 30% and 85%, between 30% and 85%, between 30% and 90%, between 40% and 80%, between 40% and 95%, between 40% and 75%, between 55% and 65%, between 35% and 90%, between 45% and 80%, between 75% and 95%, or any range within one of the foregoing ranges).

In some embodiments, the methods described herein are used to fabricate first element 102 such that the thickness of the element, measured in a direction orthogonal to the planar surfaces of first element 102, is between 100-200 µm (e.g., between 110 and 200 µm, between 115 and 200 µm, between 120 and 200 µm, between 130 and 200 µm, between 150 and 200 µm, between 100 and 190 µm, between 100 and 180 µm, between 100 and 170 µm, between 100 and 160 µm, between 100 and 150 µm, between 100 and 140 µm, or any range within one of the foregoing ranges).

At step (132) a polymer-based membrane is formed by exposing the surface of the first element 102 to a fluorosilane composition to form a layer 104 that includes one or more fluorosilane compounds on the surface of the first element 102.

A variety of different methods can be used to form layer 104. In some embodiments, for example, layer 104 can be formed in a single step dip-coating approach (e.g., by dipping first element 102 in a bath that includes the fluorinated silane compound to form layer 104 on first element 102). Alternative methods for forming layer 104 include, but are not limited to, spin coating, drop casting, sol-gel methods, and combinations of any of the foregoing methods. As an example, a plasma-treated first element 102 was dip-coated in a solution that included the fluorinated silane compound 3,3,4,4,5,5,6,6,7,7,8,8,9,9,10,10,11,11,12,12,12-Heneicosafluorododecyltrichlorosilane (F21-$CH_2CH_2$—$SiCl_3$). The fluorinated silane compound was dissolved in a n-hexane solution prior to dip coating. Newly formed membranes can be removed from the solution that contains the silane compound(s) and dried (e.g., at room temperature for 2 hours).

In some embodiments, a molar percentage of all fluorinated silane compounds in the membrane that is formed according to the methods described herein is between 1% and 10% (e.g., between 1.5% and 10%, between 3% and 10%, between 4.5% and 10%, between 5.5% and 10%, between 1% and 9.5%, between 1% and 8.5%, between 1% and 8%, between 1% and 7.5%, between 1% and 7%, between 1% and 6.5%, between 1% and 6%, or any range within one of the foregoing ranges).

It should be noted that although in the foregoing discussion membranes are prepared by first generating active sites on the surface of first element 102, this step is optional. Membranes can also be prepared without generating active sites, and instead directly forming layer 104 on first element 102 using any of the methods described herein.

In some embodiments, the casting solution used to form first element 102 can include nanoparticles. For example, as shown in step 126a of FIG. 2B, nanoparticles can be added to the casting solution prior to casting. In general, any of the different types of nanoparticles described above in connection with FIG. 1 can be added to the casting solution, and the nanoparticles can be added in sufficient concentrations to achieve any of the different compositions of nanoparticles described above.

Figure 2B:
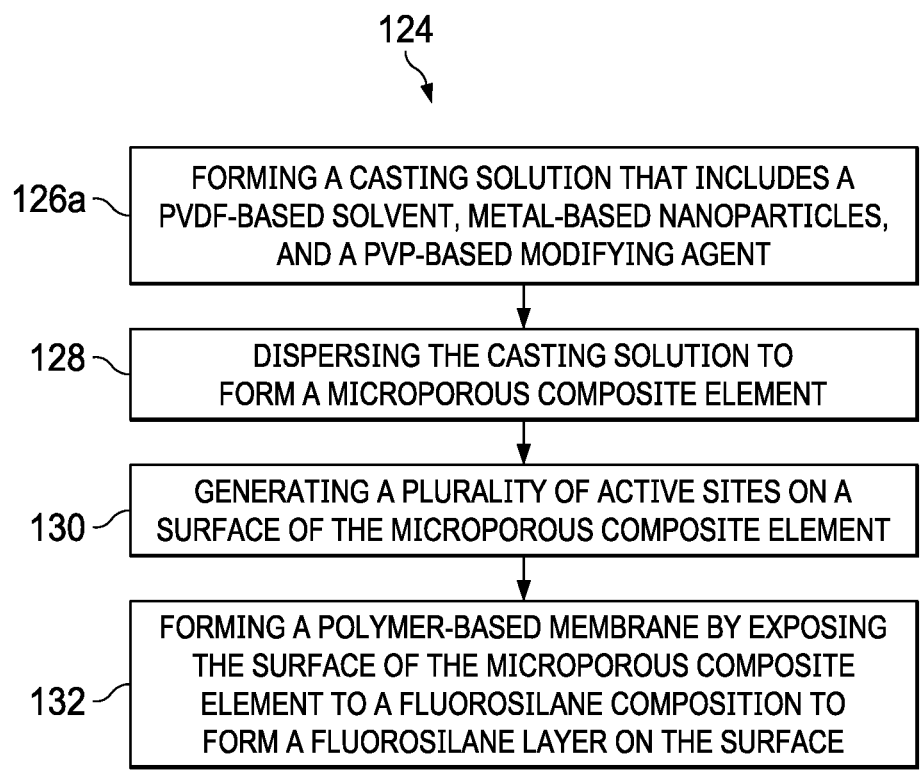

As one example, in step 126a of FIG. 2B, a solution of 5% $TiO_2$, ultrasonicated in 5 milliliters (mL) of acetone (e.g., $C_3H_6O$) to achieved homogeneity, was added to the PVDF-based casting solution. The casting solution including the nanoparticles was magnetically stirred for 24 hours at room temperature.

To compare relative performance attributes of the membranes fabricated according to the methods described herein, the wetting behavior of plasma etched polymer-based membranes 100 after chemical modification with different concentrations of a fluorinated silane compound was measured. Active sites were introduced into the PVDF-based first layer 102 of each membrane, followed by single step dip-coating of the first elements 102 to form the membranes Each membrane was prepared by dip coating a first layer 102 in a hexane-based coating solution, each solution having a different concentration of a fluorinated silane compound (e.g., F21-$CH_2CH_2$—$SiCl_3$). Solutions with four different amounts of the fluorinated silane compound (e.g., 50 mg, 100 mg, 200 mg, and 400 mg) in n-hexane were prepared and used to fabricate corresponding membranes.

The surface wettability of a PVDF membrane (i.e. no layer 104), a chemically modified PVDF membrane (i.e., a membrane formed without generating active sites before applying layer 104 to first element 102), and a chemically modified PVDF membrane with plasma etched surfaces (i.e., plasma etching of first element 102 followed by dip coating to deposit layer 104) was evaluated by utilizing a drop shape analyzer (e.g., KRUSS, Germany) for water and oil (n-hexane) in an ambient environment. A 5 microliter (µL) liquid droplet at ambient temperature was placed carefully on the surface of each tested sample and the image was recorded. Contact angle measurements were recorded using the sessile drop method over different regions of the membranes and the average values for each test sample were calculated.

The optimum amount or concentration of the fluorinated silane compound in layer 104 that achieves the maximum contact angle for water and oil was determined.

Figure 3:
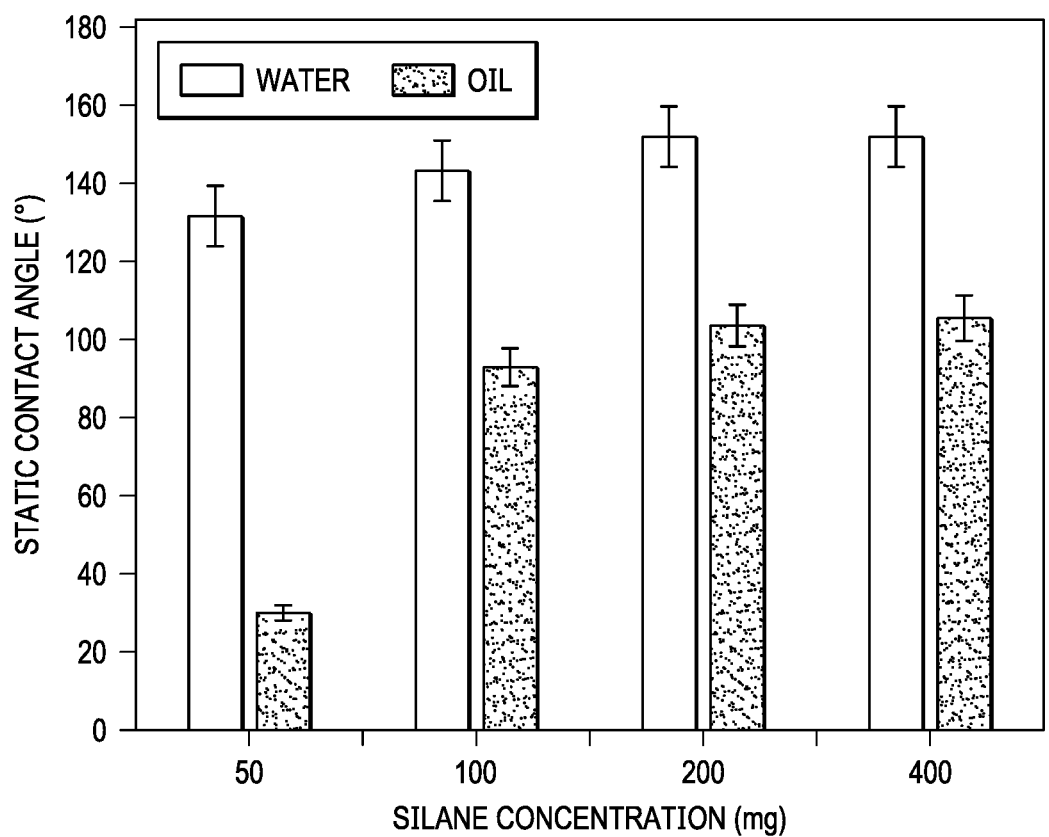
FIG. 3 is a chart showing the wetting behavior of a plasma etched polymer-based membrane as a function of a concentration of a fluorinated silane constituent.

The measured results are shown in FIG. 3. Increasing the fluorinated silane amount in the coating solution from 50 mg to 200 mg resulted in an increase in the static contact angle values for water and oil. Membranes that were both super-hydrophobic and oleo-phobic surfaces were produced with approximately 200 mg of the fluorinated silane compound $F21-CH_2CH_2-SiCl_3$ in the coating solution.

Figure 4:
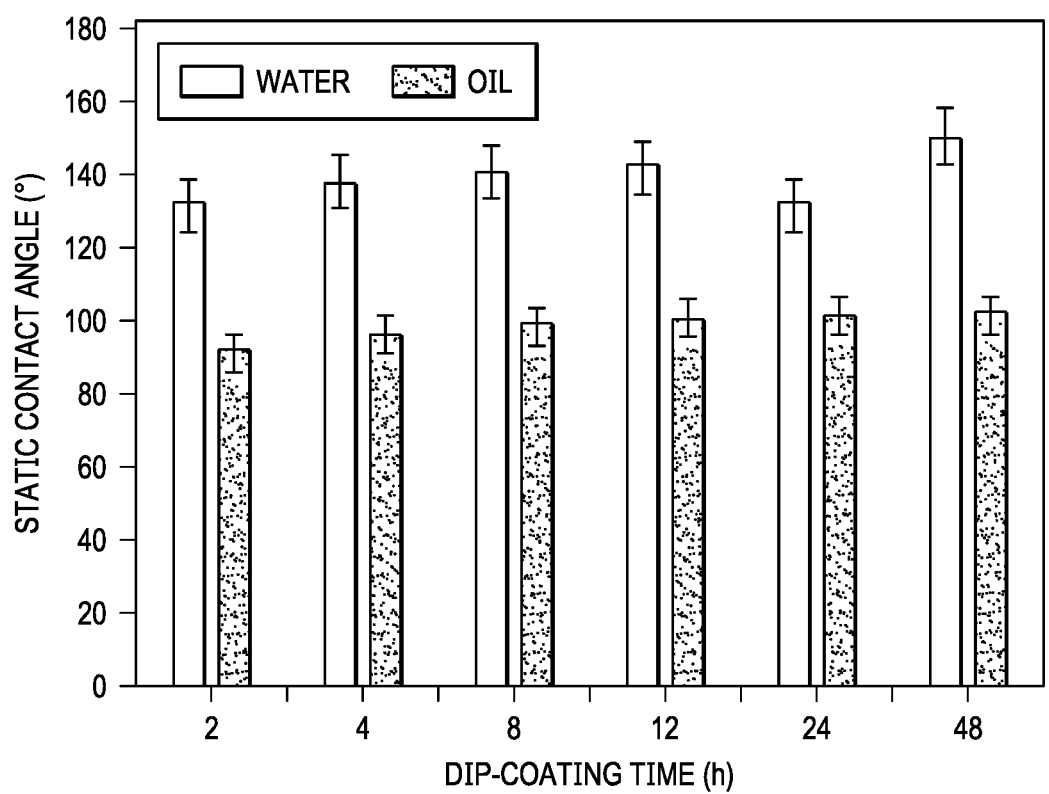
FIG. 4 is a chart showing the wetting behavior of plasma etched polymer-based membranes processed different dip-coating times to modify the surface of the membrane.

FIG. 4 is a chart 172 showing the wetting behavior of plasma etched polymer-based membranes 100 fabricated with different dip-coating times. The effect of dip-coating times on the contact angles for water and oil for each membrane were determined. Membranes were fabricated as described above, each with a different dip-coating time (2 h, 4 h, 8 h, 16 h, 24 h, and 48 h). The dip coating solution used to fabricate the membranes contained 200 mg of the fluorinated silane compound $F21-CH_2CH_2-SiCl_3$, as described above with respect to FIG. 3.

Increasing the dip-coating time during fabrication resulted in an increase in the static contact angle values for water and oil, up to a dip-coating time of 24 hours, after which a significant increase in contact angle values was not observed, as shown in FIG. 4. Under the conditions enumerated, the optimal time for the successful formation of a super-hydrophobic and oleo-phobic PVDF-based membrane was 24 hours.

Figure 5:
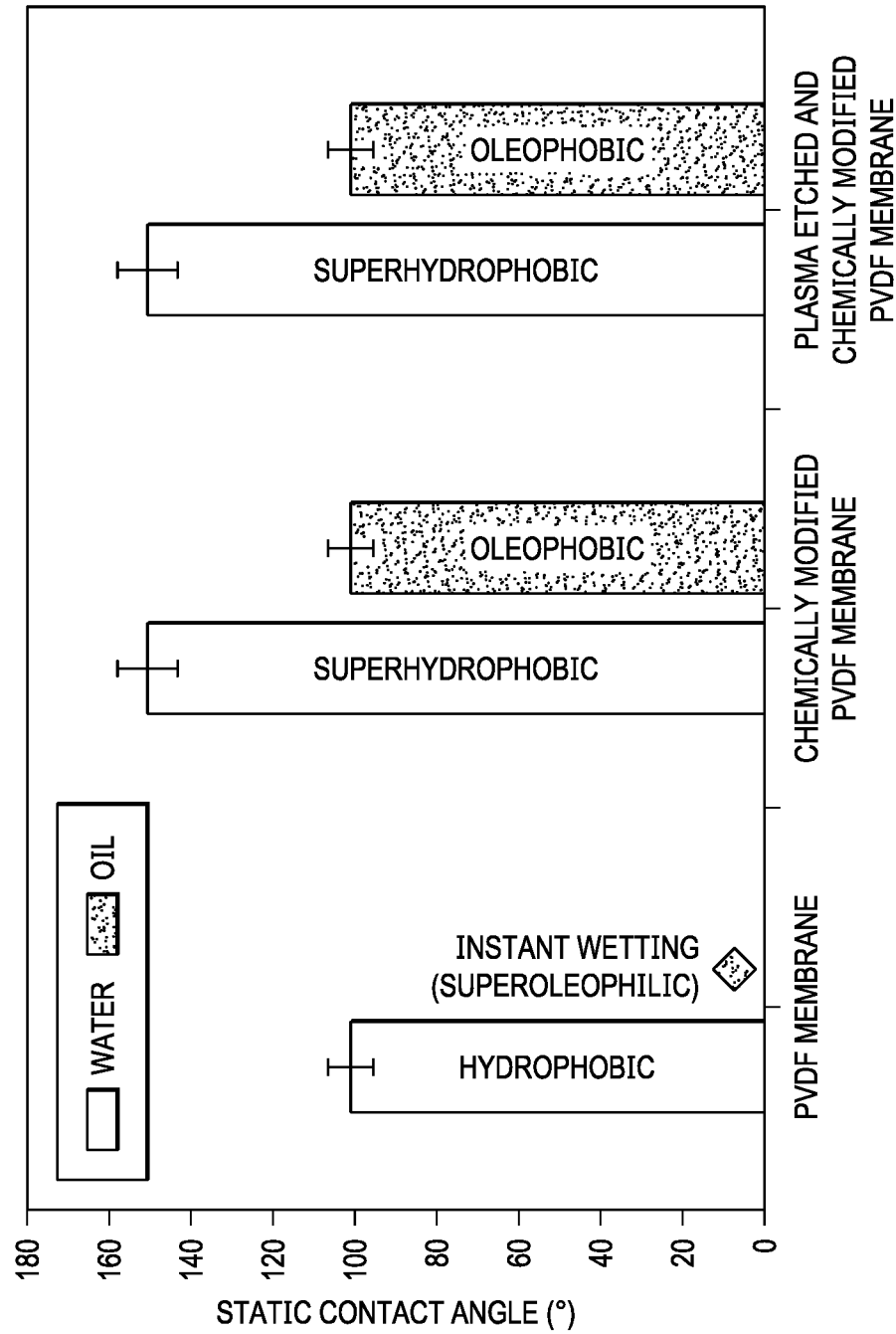
FIG. 5 is a chart showing the comparative wetting behavior of various polymer-based membranes fabricated according to different methods.

FIG. 5 is a chart 192 showing the wetting behavior of various polymer-based membranes. The results of contact angle measurements are shown for the PVDF membrane without layer 104, the non-activated chemically modified PVDF-based membrane, and plasma-etched PVDF-based membrane discussed above. Water contact angles for the PVDF-based membranes with layers 104 were 150.70° and 150.02°, and oil contact angles were 101.36° and 100.1°, respectively, illustrating both hydrophobic and super-oleophilic characteristics.

In some embodiments, the membranes fabricated according to the methods described herein can have a water contact angle of between 150.01-150.7°(e.g., between 150.03-150.7°, between 150.05-150.7°, between 150.10-150.7°, between 150.2-150.7°, between 150.5-150.7°, between 150.02-150.65°, between 150.02-150.55°, between 150.02-150.45°, between 150.02-150.35°, between 150.02-150.25°, between 150.02-150.15°, or any range within one of the foregoing ranges).

In some embodiments, the membranes fabricated according to the methods described herein can have an oil (n-hexane) contact angle of between 100.1-101.36° (e.g., between 100.15-101.36°, between 100.20-101.36°, between 100.25-101.36°, between 100.3-101.36°, between 100.4-101.36°, between 101-101.36°, between 100.1 and 101°, between 100.1-100.5°, between 100.1-100, or any range within one of the foregoing ranges).

FIG. 6 is a chart 212 showing the wetting behavior of polymer-based membranes with $TiO_2$ nanoparticles and different concentrations of the fluorinated silane compound $F21-CH_2CH_2-SiCl_3$. The membranes were evaluated to determine the optimum concentration of $F21-CH_2CH_2-SiCl_3$ for producing super-hydrophobic and oleo-phobic characteristics. As discussed above in connection with FIG. 3, improved hydrophobicity and oleophobicity was observed for membranes produced by dip coating in coating solutions where the amount of $F21-CH_2CH_2-SiCl_3$ increased up to 200 mg. Beyond this amount of $F21-CH_2CH_2-SiCl_3$ in the coating solution, no significant enhancement in the contact angle values was observed.

FIG. 7 is a chart 232 showing the comparative wetting behavior of various polymer-based membranes with $TiO_2$ nanoparticles. The surface wetting behavior of PVDF membranes with $TiO_2$ nanoparticles, non-etched PVDF-based membranes with $TiO_2$ nanoparticles and a layer containing the fluorinated silane compound $F21-CH_2CH_2-SiCl_3$, and PVDF-based membranes with $TiO_2$ nanoparticles, plasma-etched and featuring a layer containing the fluorinated silane compound $F21-CH_2CH_2-SiCl_3$, was determined. Contact angle measurement results showed that the surface of PVDF membranes with $TiO_2$ nanoparticles was hydrophobic with an average water contact angle of 100°, but oil wetted the membrane surface. However, the surfaces of membranes (both etched and non-etched) with $TiO_2$ nanoparticles and the layer containing the fluorinated silane compound $F21-CH_2CH_2-SiCl_3$ were super-hydrophobic with a water contact angle of ~150° and oleo-phobic with an oil (n-hexane) contact angle of ~110°.

Application: The fabricated membranes can be fabricated to control the permeation water flux, rate of salt rejection, and antifouling properties of the membranes. As such, they can be used in various membrane-based technologies and applications such as reverse osmosis (RO), forward osmosis (FO), nanofiltration (NF), ultrafiltration (UF), and microfiltration (MF). The membranes are durable and they also have economic advantages due to the simple fabrication method, and the durability and availability of the constituent materials. The simple fabrication methods described herein can nonetheless yield membranes with super-hydrophobic and oleo-phobic characteristics. Suitable uses and applications for the membranes include, but are not limited to, different configurations of membrane distillation technology, the treatment of produced water from petroleum reservoirs, treatment of oily wastewater, treatment of highly saline water with high fouling characteristics, treatment of contaminated groundwater, treatment of brackish water, and for other applications in which water- and/or oil-repellent surfaces are advantageous or required.

The fabricated membranes can also serve as a barrier between the feed and the permeation sides of a membrane desalination module. They can also be used for removing volatile organic compounds from water, concentration of acids, bases, and other analytes in a variety of chemical and biochemical assays, crystallization of dissolved species, separation of azeotropic mixtures of compounds, and for a variety of selective filtering processes such as dye filtration/removal in textile fabrication processes.

While this specification contains many specific implementation details, these should not be construed as limitations on the scope of what may be claimed, but rather as descriptions of features that may be specific to particular implementations. Features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

What is claimed is:

1. A method for fabricating a polymer-based membrane, the method comprising:
    forming a casting solution comprising a polyvinylidene fluoride (PVDF)-based solvent, and a polyvinylpyrrolidone (PVP)-based modifying agent;
    dispersing the casting solution to form a first element;
    generating a plurality of active sites on a surface of the first element; and
    forming a polymer-based membrane by exposing the surface of the first element to a fluorosilane composition to form a fluorosilane layer on the surface, wherein the fluorosilane composition comprises 3,3,4,4,5,5,6,6,7,7,8,8,9,9,10,10,11,11,12,12,12-heneicosafluorododecyltrichlorosilane ($CF_3(CF_2)_9CH_2CH_2SiCl_3$).

2. The method of claim 1, wherein exposing the surface of the first element to the fluorosilane composition comprises dip-coating the surface in the fluorosilane composition to form the fluorosilane layer.

3. The method of claim 1, wherein generating the plurality of active sites comprises plasma etching the surface of the first element.

4. The method of claim 1, wherein forming the casting solution comprises dissolving a polyvinylidene fluoride-based agent in a solvent.

5. The method of claim 4, wherein the polyvinylidene fluoride-based agent comprises unsubstituted polyvinylidene fluoride.

6. The method of claim 4, wherein the polyvinylidene fluoride-based agent comprises at least one substituted polyvinylidene fluoride compound.

7. The method of claim 6, wherein the polyvinylidene fluoride-based agent comprises unsubstituted polyvinylidene fluoride and at least one substituted polyvinylidene fluoride compound.

8. The method of claim 4, wherein a molar percentage concentration of the polyvinylidene fluoride-based agent in the casting solution is between 5% and 20%.

9. The method of claim 1, further comprising forming the first element by coagulating the dispersed casting solution in a coagulation bath.

10. The method of claim 1, wherein dispersing the casting solution comprises dispersing the casting solution on a surface using a casting knife.

11. The method of claim 1, wherein a weight percentage of the fluorosilane composition in the membrane is between 5 weight % and 50 weight %.

12. A polymer-based membrane comprising:
    a first element comprising a polyvinylpyrrolidone (PVP) modifying agent and a polyvinylidene fluoride (PVDF)-based compound; and
    a fluorosilane layer disposed on the first element and comprising at least one fluorinated chlorosilane compound,
    wherein the at least one fluorinated chlorosilane compound comprises 3,3,4,4,5,5,6,6,7,7,8,8,9,9,10,10,11,11,12,12,12-heneicosafluorododecyltrichlorosilane ($CF_3(CF_2)_9CH_2CH_2SiCl_3$);
    wherein a water contact angle for the membrane is greater than 150°; and
    wherein an oil contact angle for the membrane is greater than 100°.

13. The membrane of claim 12, wherein a weight percentage of the at least one fluorinated chlorosilane compound in the membrane is between 5 weight % and 50 weight %.

* * * * *